United States Patent
Tsushima et al.

(10) Patent No.: US 12,437,922 B2
(45) Date of Patent: Oct. 7, 2025

(54) MULTILAYER CERAMIC ELECTRONIC DEVICE AND MANUFACTURING METHOD OF THE SAME

(71) Applicant: TAIYO YUDEN CO., LTD., Tokyo (JP)

(72) Inventors: Yuji Tsushima, Tokyo (JP); Yasuhiro Matsumoto, Tokyo (JP); Koichiro Morita, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 148 days.

(21) Appl. No.: 18/172,125

(22) Filed: Feb. 21, 2023

(65) Prior Publication Data

US 2023/0298819 A1  Sep. 21, 2023

(30) Foreign Application Priority Data

Mar. 15, 2022 (JP) .................................. 2022-040493

(51) Int. Cl.
*H01G 4/12* (2006.01)
*H01G 4/30* (2006.01)

(52) U.S. Cl.
CPC ............. *H01G 4/1227* (2013.01); *H01G 4/30* (2013.01)

(58) Field of Classification Search
CPC ......... H01G 4/30; H01G 4/1227; H01G 4/228
USPC .... 361/301.4, 321.1, 321.2, 321.4, 311, 312, 361/321.5
See application file for complete search history.

(56) References Cited

U.S. PATENT DOCUMENTS

| | | | | |
|---|---|---|---|---|
| 2002/0049131 A1* | 4/2002 | Kawamoto | ......... | C04B 35/4682 501/139 |
| 2003/0096125 A1* | 5/2003 | Ogasawara | ....... | C04B 35/62886 156/89.12 |
| 2006/0264317 A1* | 11/2006 | Banno | ...................... | H01G 4/30 501/138 |
| 2014/0233149 A1* | 8/2014 | Jeon | ...................... | H01G 4/232 427/79 |
| 2015/0041195 A1* | 2/2015 | Ahn | ......................... | H01G 4/30 361/301.4 |
| 2015/0270067 A1* | 9/2015 | Iinuma | ................. | C04B 35/4682 501/137 |
| 2017/0133155 A1* | 5/2017 | Suzuki | ..................... | H01B 3/12 |

(Continued)

FOREIGN PATENT DOCUMENTS

| JP | 2011-124429 A | 6/2011 |
|---|---|---|
| JP | 2017-11172 A | 1/2017 |

*Primary Examiner* — Arun Ramaswamy
(74) *Attorney, Agent, or Firm* — Stein IP, LLC (57) ABSTRACT

A multilayer ceramic electronic device includes a plurality of internal electrode layers, a plurality of dielectric layers, each of which has a perovskite structure that is expressed by a general formula of $ABO_3$, a pair of cover layers respectively provided on an upper end and a lower end in a stacking direction in a capacity section, and has a main component that is a same as a main component of the plurality of dielectric layers. The capacity section has a first section positioned in a center portion in the stacking direction and a pair of second sections outside of the first section in the stacking direction. An A/B ratio of the first section is larger than the A/B ratio of the second section. The A/B ratio of the pair of cover layers is larger than the A/B ratio of the first section.

10 Claims, 7 Drawing Sheets

(56) References Cited

U.S. PATENT DOCUMENTS

2022/0199324 A1* 6/2022 Seo ........................ H05K 1/181
2022/0208455 A1* 6/2022 Nam ........................ H01G 4/30

* cited by examiner

MULTILAYER CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2022-040493, filed on Mar. 15, 2022, the entire contents of which are incorporated herein by reference.

FIELD

A certain aspect of the present invention relates to a multilayer ceramic electronic device and a manufacturing method of the multilayer ceramic electronic device.

BACKGROUND

Multilayer ceramic electronic devices such as multilayer ceramic capacitors are used to eliminate noise in high-frequency communication systems typified by mobile phones.

SUMMARY OF THE INVENTION

According to an aspect of the present invention, there is provided a multilayer ceramic electronic device including: a plurality of internal electrode layers that are stacked so as to face each other; a plurality of dielectric layers, each of which is provided through each of the plurality of internal electrode layers and has a perovskite structure that includes an A site element and a B site element and is expressed by a general formula of $ABO_3$; a pair of cover layers that are respectively provided on an upper end and a lower end in a stacking direction of the plurality of internal electrode layers in a capacity section in which the plurality of internal electrode layers face each other, and has a main component that is a same as a main component of the plurality of dielectric layers, wherein the capacity section has a first section positioned in a center portion in the stacking direction and a pair of second sections outside of the first section in the stacking direction, wherein an A/B ratio of the first section is larger than the A/B ratio of the second section, and wherein the A/B ratio of the pair of cover layers is larger than the A/B ratio of the first section.

According to another aspect of the present invention, there is provided a manufacturing method of a multilayer ceramic electronic device including: preparing a plurality of first ceramic green sheets including ceramic having a perovskite structure that includes an A site element and a B site element and is expressed by a general formula of $ABO_3$; preparing a plurality of second ceramic green sheets that include the ceramic and have a smaller A/B ratio than the plurality of first ceramic green sheets; preparing a pair of third ceramic green sheets that include the ceramic and have a larger A/B ratio than the plurality of first ceramic green sheets; forming an internal electrode pattern on each of the plurality of first ceramic green sheets; stacking the plurality of first ceramic green sheets on which the internal electrode layer is formed; stacking the plurality of second ceramic green sheets on an upper end and a lower end of the plurality of first ceramic green sheets that are stacked; forming a multilayer structure by respectively stacking the pair of third ceramic green sheets on an upper end and a lower end of the plurality of first ceramic green sheets and the second ceramic green sheets that are stacked; and firing the multilayer structure.

DETAILED DESCRIPTION

A multilayer ceramic electronic device includes a capacity section having electric capacity and a pair of cover layers sandwiching the capacity section from above and below in the stacking direction. Since the amount of metal components diffused from the internal electrode layer is small in the cover layer, the densification temperature is higher than that of the capacity section and there is a possibility that problems with moisture resistance may occur because the cover layer is not sufficiently densified compared to the capacity section. In order to promote the densification of the cover layer, there is a method of adding silicon or manganese to the cover layer (Japanese Patent Application Publication No. 2011-124429 and Japanese Patent Application Publication No. 2017-011172). However, silicon and manganese diffused into the capacity section. And, reduction of dielectric constant or abnormal grain growth may occur and reliability may be degraded, Therefore, it is preferable that the composition of the cover layer and the capacity section be close to the same without adding additives to the cover layer as much as possible.

Another method is to lower the densification temperature of the cover layer by making the molar ratio of the A-site element to the B-site element (A/B ratio) larger in the cover layer than in the capacity section. However, in this case, due to the difference in the A/B ratio, the A-site element tends to diffuse from the cover layer into the capacity section, and abnormal grain growth tends to occur in the capacity section, and the reliability may be degraded.

A description will be given of an embodiment with reference to the accompanying drawings.

Figure 1:
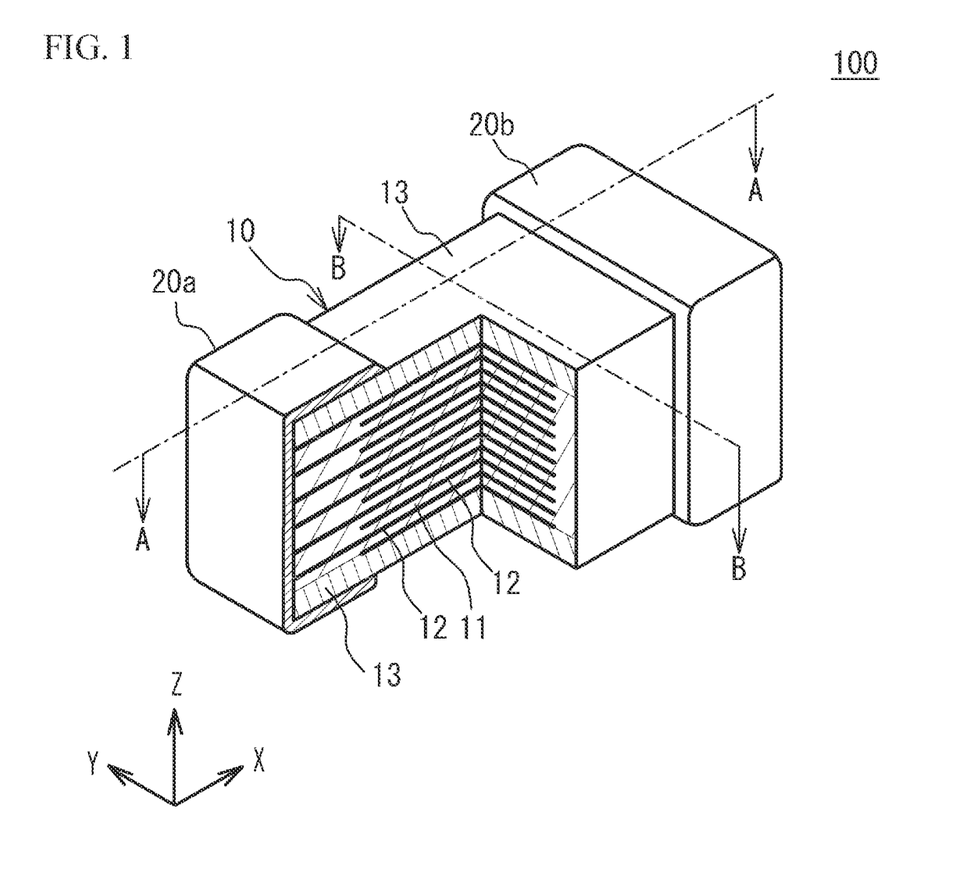
FIG. 1 illustrates a perspective view of a multilayer ceramic capacitor in which a cross section of a part of the multilayer ceramic capacitor is illustrated.
Figure 2:
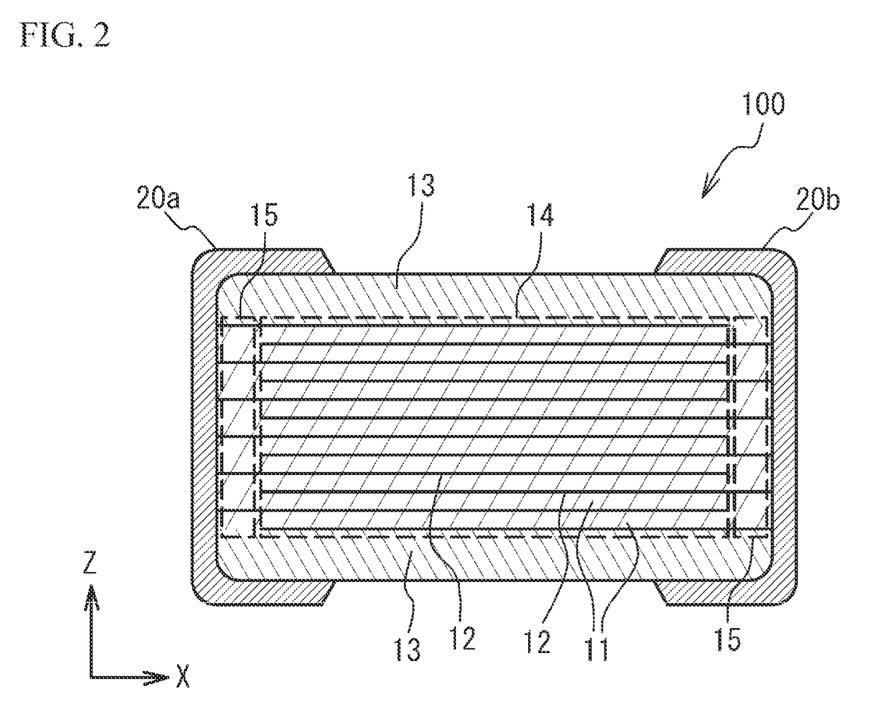
FIG. 2 illustrates a cross sectional view taken along a line A-A of FIG. 1.
Figure 3:
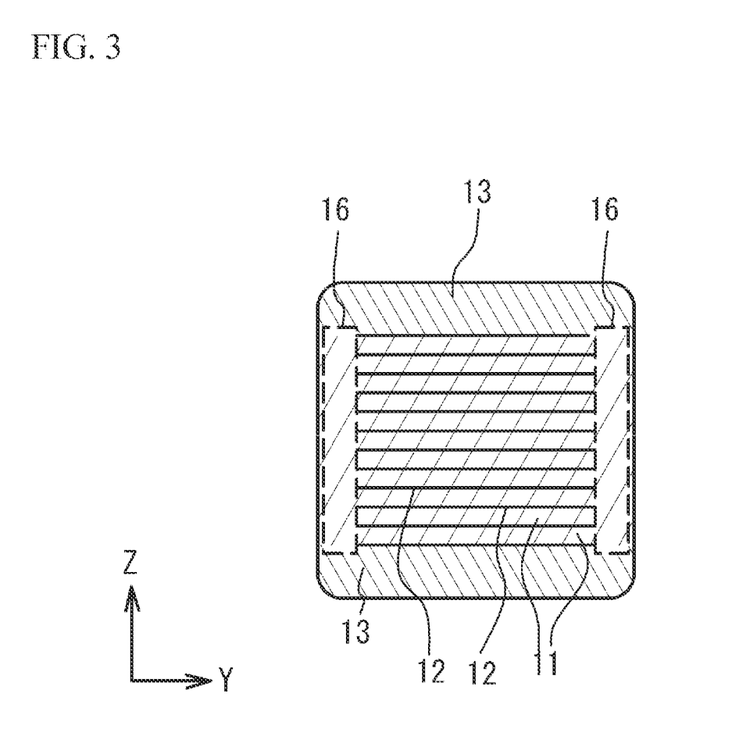
FIG. 3 illustrates a cross sectional view taken along a line B-B of FIG. 1.

(Embodiment) FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

In FIG. 1 to FIG. 3, an X-axis direction is a longitudinal direction of the multilayer chip 10. The X-axis direction is a direction in which the two end faces of the multilayer chip 10 are opposite to each other and in which the external electrode 20a is opposite to the external electrode 20b. A Y-axis direction is a width direction of the internal electrode layers. The Y-axis direction is a direction in which the two side faces of the multilayer chip 10 are opposite to each other. A Z-axis direction is a stacking direction. The Z-axis direction is a direction in which the upper face of the multilayer chip 10 is opposite to the lower face of the multilayer chip 10. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The main component of the internal electrode layer 12 is not particularly limited, but is a base metal such as Ni, Cu (copper), Sn (tin). As a main component of the internal electrode layers 12, noble metals such as Pt (platinum), Pd (palladium), Ag (silver), Au (gold), and alloys containing these may be used. The thickness of the internal electrode layer 12 is, for example, 0.1 μm or more and 3 μm or less, 0.1 mμ or more and 1 μm or less, or 0.1 μm or more and 0.5 μm or less.

A main component of the dielectric layer 11 is a ceramic material having a perovskite structure expressed by a general formula $ABO_3$. The perovskite structure includes $ABO_{3-\alpha}$ having an off-stoichiometric composition. In the embodiment, barium titanate ($BaTiO_3$) is used as the ceramic material. For example, the dielectric layer 11 includes 90 at % or more of barium titanate. The thickness of the dielectric layer 11 is, for example, 0.2 μm or more and 10 μm or less, 0.2 mμ or more and 5 μm or less, or 0.2 μm or more and 2 μm or less.

Additives may be added to the dielectric layer 11. As additives to the dielectric layer 11, zirconium (Zr), hafnium (Hf), magnesium (Mg), manganese (Mn), molybdenum (Mo), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of Co (cobalt), Ni (nickel), Li (lithium), B (boron), Na (sodium), K (potassium) or Si (silicon), or a glass including cobalt, nickel, lithium, boron, sodium, potassium or silicon.

The cover layer 13 is a dielectric composition, and its main component is, for example, a ceramic material having a perovskite structure represented by the general formula $ABO_3$. The perovskite structure contains $ABO_{3-\alpha}$ outside the stoichiometric composition. In this embodiment, barium titanate ($BaTiO_3$) is used as the ceramic material. For example, the cover layer 13 contains 90 at % or more of barium titanate. The thickness of the cover layer 13 is, for example, 5 μm or more and 15 μm or less, 20 μm or more and 60 μm or less, and 80 μm or more and 100 μm or less.

Additives may be added to the cover layer 13. As additives to the cover layer 13, zirconium (Zr), hafnium (Hf), magnesium (Mg), manganese (Mn), molybdenum (Mo), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) oxides, or an oxide of Co (cobalt), Ni (nickel), Li (lithium), B (boron), Na (sodium), K (potassium) or Si (silicon), or a glass including cobalt, nickel, lithium, boron, sodium, potassium or silicon.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

Here, each part in the capacity section 14 in FIG. 2 will be described. As exemplified in FIG. 4, the central section in the Z-axis direction of the capacity section 14 is called a first section 30. A pair of sections of the capacity section 14 located outside the first section 30 in the Z-axis direction are referred to as second sections 40. The first section 30 and the second section 40 include at least one of the dielectric layers 11 and may include two or more of the dielectric layers 11.

Figure 4:
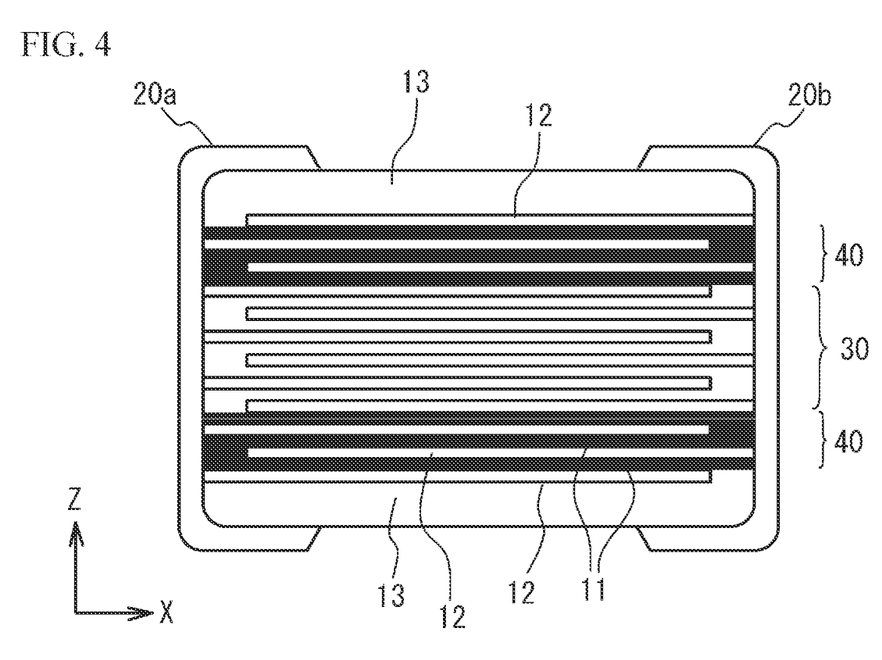
FIG. 4 illustrates each part in a capacity section.

In the present embodiment, the A/B ratio in barium titanate having a perovskite structure represented by the general formula $ABO_3$, that is, the molar ratio of barium to 100 mol of titanium (Ba/Ti ratio) is higher than that of the cover layer 13 in the first section 30. The Ba/Ti ratio of the second section 40 is smaller than that of the first section 30. With this configuration, the Ba/Ti ratio in the cover layer 13 increases. Therefore, the densification temperature of the cover layer 13 can be lowered. This reduces the porosity of the cover layer 13 and improves the moisture resistance. Next, since the Ba/Ti ratio is smaller in the second section 40 than in the first section 30, the barium of the cover layer 13 is mainly diffused into the second section 40. Therefore, diffusion of barium into the first section 30 from the cover layer 13 will be suppressed. This suppresses abnormal grain growth in the first section 30, prolongs the life of the multilayer ceramic capacitor 100, and improves reliability of the multilayer ceramic capacitor 100. As described above, according to the present embodiment, both good moisture resistance and good reliability can be achieved. The A/B ratio of the first section 30 is measured by measuring an average of 10 points of the dielectric layers 11 which is located on 50% thickness of the first section 30. The A/B ratio of the second section 40 is measured by measuring an average of 10 points of the dielectric layer 11 which is the closest to the cover layer 13.

When the Ba/Ti ratio in the first section 30 is near stoichiometry, the reliability of the multilayer ceramic capacitor 100 is greatly affected if the A/B ratio fluctuates even by a unit of $\frac{1}{1000}$ due to the mixing of a small amount of zirconium. Therefore, in the first section 30, it is preferable to make the Ba/Ti ratio smaller than the stoichiometry. For example, the Ba/Ti ratio in the first section 30 is preferably 0.980 or less, more preferably 0.970 or less, and even more preferably 0.965 or less.

On the other hand, when the Ba/Ti ratio in the first section 30 is too small, the densification temperature of the first section 30 increases and the first section 30 may not be sufficiently densified. Therefore, it is preferable to set a lower limit to the Ba/Ti ratio in the first section 30. For example, the Ba/Ti ratio in the first section 30 is preferably 0.970 or higher, more preferably 0.973 or higher, and even more preferably 0.975 or higher.

When the Ba/Ti ratio in the cover layer 13 is too large, the densification temperature of the cover layer 13 increases and the cover layer 13 may not be sufficiently densified. Therefore, it is preferable to set an upper limit for the Ba/Ti ratio in the cover layer 13. For example, the Ba/Ti ratio in the cover layer 13 is preferably 1.010 or less, preferably 1.008 or less, and preferably 1.006 or less.

On the other hand, when the Ba/Ti ratio in the cover layer 13 is too small, abnormal grain growth may occur in the cover layer 13. Therefore, it is preferable to set a lower limit for the Ba/Ti ratio in the cover layer 13. For example, the Ba/Ti ratio in the cover layer 13 is preferably 1.005 or more, more preferably 1.005 or more, and even more preferably 1.0055 or more.

When the Ba/Ti ratio in the second section 40 is too large, the diffusion of barium from the cover layer 13 to the first section 30 may not be sufficiently suppressed. Therefore, it is preferable to set an upper limit for the Ba/Ti ratio in the second section 40. For example, the Ba/Ti ratio in the second section 40 is preferably 0.960 or less, more preferably 0.955 or less, and even more preferably 0.950 or less.

On the other hand, when the Ba/Ti ratio in the second section 40 is too small, the densification temperature rises and there is a risk that the joint portion of the cover layer 13 cannot be sufficiently densified. Therefore, it is preferable to set a lower limit for the Ba/Ti ratio in the second section 40. For example, the Ba/Ti ratio in the second section 40 is preferably 0.950 or higher, more preferably 0.960 or higher, and even more preferably 0.970 or higher.

When the porosity of the cover layer 13 is high, moisture may easily enter the cover layer 13 and the moisture resistance of the multilayer ceramic capacitor 100 may decrease. Therefore, it is preferable to set an upper limit for the porosity of the cover layer 13. For example, in a cross section along the stacking direction, the area ratio of pores is preferably 10% or less, more preferably 5% or less, and even more preferably 3% or less. The porosity of the cover layer 13 can be lowered by lowering the densification temperature of the cover layer 13 to promote densification.

The dielectric layer 11 in the first section 30 may contain at least one of zirconium and hafnium at the B site in the perovskite structure. For example, zirconium and hafnium may form a substitution solid solution at the B site of barium titanate. The dielectric layer 11 containing at least one of zirconium and hafnium suppresses diffusion of barium from the cover layer 13 into the dielectric layer 11.

The thickness of each of the second sections 40 in the Z-axis direction is, for example, 1 μm or more and 5 μm or less, 3 μm or more and 9 μm or less, or 6 μm or more and 15 μm or less. The number of stacked dielectric layers 11 in each of the second sections 40 is 0.01 times or more and 0.05 times or less, and 0.03 times or more and 0.06 times or less, and 0.06 times or more and 0.10 times or less as the number of stacked dielectric layers 11 in the first section 30. Alternatively, the second section 40 may mean only the outermost dielectric layer 11 of the capacity section 14.

In the above embodiment, attention is paid to the Ba/Ti ratio as an example of the A/B ratio. However, when at least one of the A site and the B site contains another element, the A/B ratio is the molar ratio of the total A-site elements to the total B-site elements.

Figure 5:
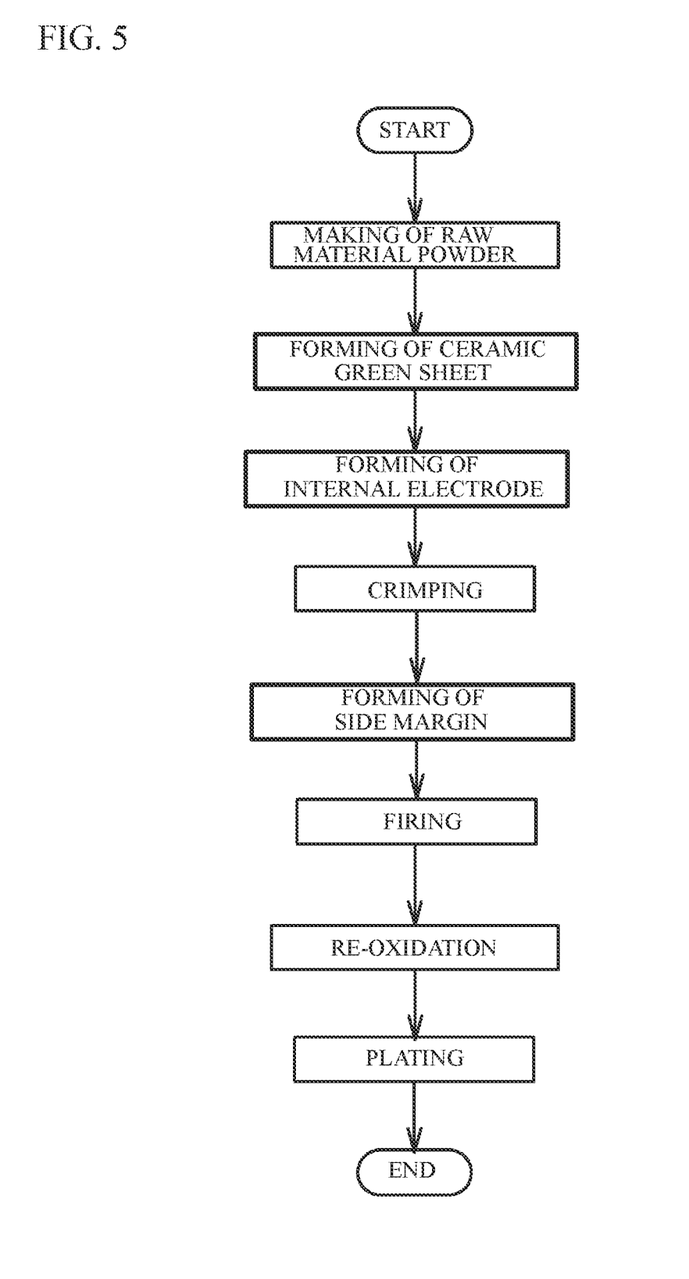
FIG. 5 illustrates a manufacturing method of a multilayer ceramic capacitor.

Next, a description will be given of a manufacturing method of the multilayer ceramic capacitors 100. FIG. 5 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of zirconium, hafnium, magnesium, manganese, molybdenum, vanadium, chromium, rare earth elements (yttrium, samarium, europium, gadolinium, terbium, dysprosium, holmium, erbium, thulium and ytterbium) or an oxide of cobalt, nickel, lithium, boron, sodium, potassium or silicon, or a glass including cobalt, nickel, lithium, boron, sodium, potassium or silicon.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the grain diameter of the resulting ceramic power may be adjusted by combining the crushing and classifying. With the processes, a dielectric material is obtained. For the crushing, zirconia beads may be used. When the zirconia beads are used, a small amount of zirconia beads can be added to the dielectric material.

(Forming process of ceramic green sheet) Next, a binder such as polyvinyl butyral (PVB) resin, an organic solvent such as ethanol or toluene, and a plasticizer are added to the resulting dielectric material and wet-blended. With use of the resulting slurry, a ceramic green sheet 52 is formed on a base material 51 by, for example, a die coater method or a doctor blade method, and then dried. The base material 51 is, for example, PET (polyethylene terephthalate) film. The forming process is not illustrated.

Figure 6A:
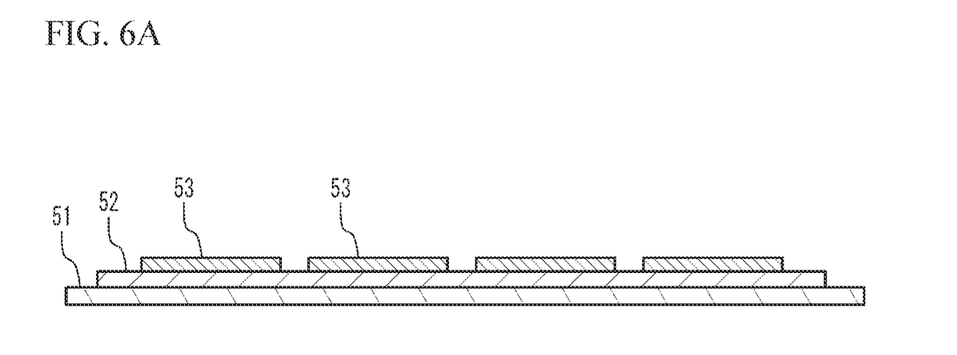
FIG. 6A illustrates a forming process of an internal electrode layer.

(Forming process of internal electrode layer) Next, as illustrated in FIG. 6A, an internal electrode pattern 53 is formed on the ceramic green sheet 52. In FIG. 6A, as an example, four parts of the internal electrode pattern 53 are formed on the ceramic green sheet 52 and are spaced from each other. The ceramic green sheet 52 on which the internal electrode pattern 53 is formed is a stack unit. A metal paste of the main component metal of the internal electrode layer 12 is used as the internal electrode pattern 53. Ceramic particles as a co-material are added to the metal paste. A main component of the ceramic particles is not limited. It is preferable that the main component of the ceramic particles is the same as the main component ceramic of the dielectric layer 11. For example, barium titanate of which an average particle diameter is 50 nm or less may be dispersed in the metal paste.

Figure 6B:
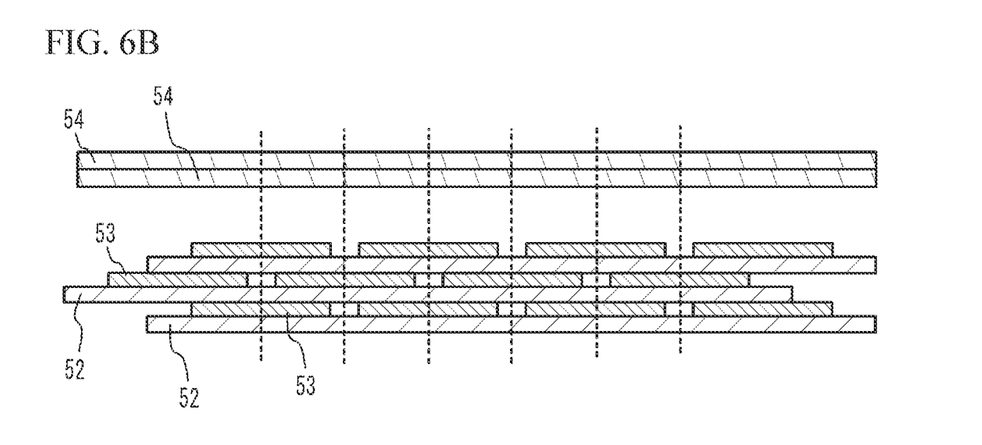
FIG. 6B illustrates a crimping process.
Figure 7A:
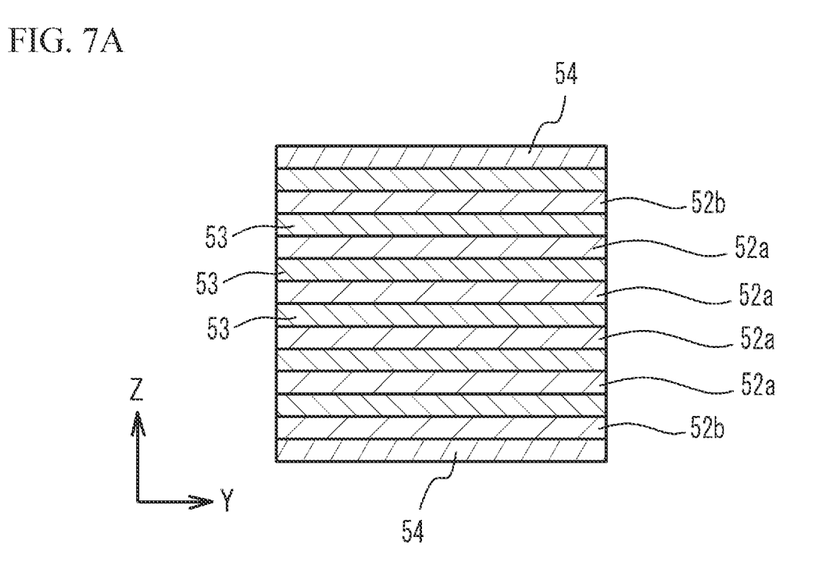
FIG. 7A and FIG. 7B illustrate a forming process of a side margin.

(Crimping process) Next, the ceramic green sheets 52 are peeled from the base materials 51. As illustrated in FIG. 6B, the stack units are stacked. Next, a predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 6B, the multilayer structure is cut along a dotted line. FIG. 7A illustrates a cross section in a Y-Z plane in the multilayer structure after cutting.

As illustrated in FIG. 7A, the ceramic green sheets 52 include two types of first ceramic green sheets 52a and second ceramic green sheets 52b. In the multilayer structure of the ceramic green sheets 52, the first ceramic green sheet 52a is positioned at the center in the stacking direction, and the second ceramic green sheets 52b are positioned outside the first ceramic green sheets 52a in the stacking direction. The A/B ratio in the first ceramic green sheet 52a is greater than the A/B ratio in the second ceramic green sheet 52b. And the A/B ratio in the cover sheet 54 (third ceramic green sheet) is greater than that of the first ceramic green sheet.

Figure 7B:
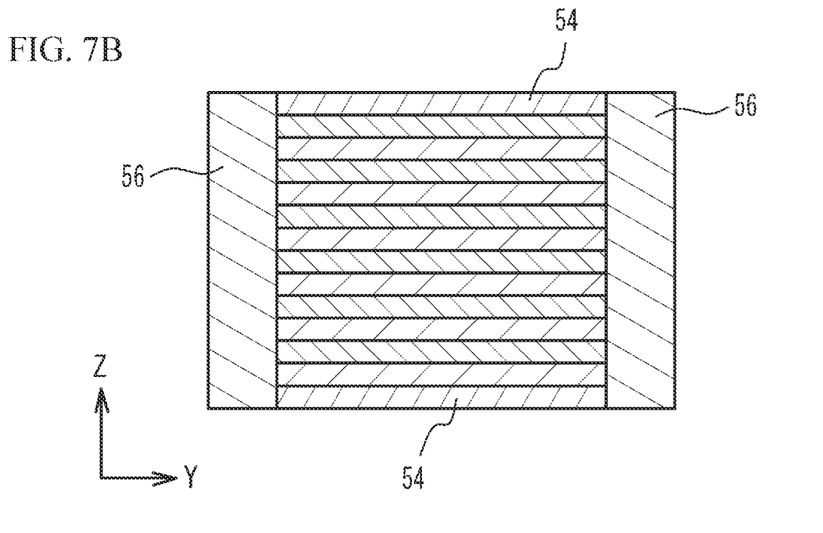

(Forming process of side margin) Next, as illustrated in FIG. 7B, a side margin sheet 56 is adhered to ends of the multilayer structure in the Y-axis direction. The side margin sheet 56 is formed by painting slurry including the material powder made in the raw material powder making process and drying the slurry.

(Firing process) The binder is removed from the ceramic multilayer structure in $N_2$ atmosphere. A metal paste to be the base layer of the external electrodes 20a and 20b is applied to the both end faces of the ceramic multilayer structure by a dipping method. The resulting ceramic multilayer structure is fired for 5 minutes to 10 minutes in a reductive atmosphere having an oxygen partial pressure of 10-12 to 10-9 MPa in a temperature range of 1160 degrees C. to 1280 degrees C.

(Re-oxidizing process) In order to return oxygen into the barium titanate which acts as the main phase of the dielectric layer 11 and is partially reduced in the firing in the reductive atmosphere, a thermal treatment is performed in a mixed gas of $N_2$ and moisture at approximately 1000 degrees C. or a normal atmosphere at 500 degrees C. to 700 degrees C. so that the internal electrode layer 12 is not oxidized. The process is called a re-oxidation process.

(Plating process) After that, by a plating process, plated layers of Cu, Ni, Sn or the like may be formed on the external electrodes 20a and 20b. With the processes, the multilayer ceramic capacitor 100 is manufactured.

According to the manufacturing method according to the present embodiment, the A/B ratio is larger in the cover layer 13 than in the first section 30 and smaller in the second section than in the first section 30. Accordingly, both good moisture resistance and good reliability can be achieved.

When the Ba/Ti ratio in the first ceramic green sheets 52a is close to stoichiometry, the reliability of the multilayer ceramic capacitor 100 may be affected if the A/B ratio fluctuates even by 1/1000 due to the inclusion of a small amount of zirconium into the first ceramic green sheet 52a. Therefore, in the first ceramic green sheets 52a, it is preferable to make the Ba/Ti ratio smaller than the stoichiometry. For example, the Ba/Ti ratio in the first ceramic green sheets 52a is preferably 0.980 or less, more preferably 0.970 or less, and even more preferably 0.965 or less.

On the other hand, when the Ba/Ti ratio in the first ceramic green sheet 52a is too small, the densification temperature of the first ceramic green sheet 52a increases. In this case, the first section 30 may not be sufficiently densified. Therefore, it is preferable to set a lower limit to the Ba/Ti ratio in the first ceramic green sheet 52a. For example, the Ba/Ti ratio in the first ceramic green sheet 52a is preferably 0.970 or more, more preferably 0.973 or more, and even more preferably 0.975 or more.

When the Ba/Ti ratio in the cover sheet 54 is too large, the densification temperature of the cover sheet 54 increases. In this case, the cover layer 13 may not be sufficiently densified. Therefore, it is preferable to set an upper limit for the Ba/Ti ratio in the cover sheet 54. For example, the Ba/Ti ratio in the cover sheet 54 is preferably 1.010 or less, preferably 1.008 or less, and preferably 1.006 or less.

On the other hand, when the Ba/Ti ratio in the cover sheet 54 is too small, abnormal grain growth may occur in the cover layer 13. Therefore, it is preferable to set a lower limit for the Ba/Ti ratio in the cover sheet 54. For example, the Ba/Ti ratio in the cover sheet 54 is preferably 1.005 or more, more preferably 1.005 or more, and even more preferably 1.0055 or more.

When the Ba/Ti ratio in the second ceramic green sheet 52b is too large, the diffusion of barium from the cover layer 13 to the first section 30 may not be sufficiently suppressed. Therefore, it is preferable to set an upper limit for the Ba/Ti ratio in the second ceramic green sheet 52b. For example, the Ba/Ti ratio in the second ceramic green sheet 52b is preferably 0.960 or less, more preferably 0.955 or less, and even more preferably 0.950 or less.

On the other hand, when the Ba/Ti ratio in the second ceramic green sheet 52b is too small, the densification temperature will be high and there is a risk that the joint portion of the cover layer 13 will not be sufficiently densified. Therefore, it is preferable to set a lower limit for the Ba/Ti ratio in the second ceramic green sheet 52b. For example, the Ba/Ti ratio in the second ceramic green sheet 52b is preferably 0.950 or more, more preferably 0.960 or more, and even more preferably 0.970 or more.

lower ends in the stacking direction were made smaller than the central section in the stacking direction. Also, the Ba/Ti ratio was made larger in the cover sheet than in the central section.

(Ba/Ti ratio) For the multilayer ceramic capacitors of Examples 1 and 2 and Comparative Examples 1 to 4, the Ba/Ti ratio of each part was examined. Specifically, the multilayer ceramic capacitor was polished with a polishing machine so that the cross section was exposed, and the polished cross section was measured using LA-ICP-MS (laser ablation inductively coupled plasma mass spectrometry). Table 1 shows the results. In addition, in the capacity section, a section of 5 μm from the upper and lower ends in the stacking direction was defined as the second section, and a section sandwiched between the second sections was defined as the first section. The interface between the first section and the second section may be the midpoint of the Ba/Ti ratio concentration gradient.

TABLE 1

|  | COVER LAYER Ba/Ti | SECOND SECTION Ba/Ti | FIRST SECTION Ba/Ti | POROSITY (%) | HUMIDITY RESISTANCE | LIFE (min) | JUDGE OF LIFE | OVERALL JUDGE |
|---|---|---|---|---|---|---|---|---|
| EXAMPLE 1 | 1.010 | 0.960 | 0.980 | 5 | ○ | 4500 | ○ | ○ |
| EXAMPLE 2 | 1.006 | 0.960 | 0.980 | 3 | ○ | 4900 | ○ | ○ |
| COMPARATIVE EXAMPLE 1 | 0.980 | 0.980 | 0.980 | 20 | X | 4800 | ○ | X |
| COMPARATIVE EXAMPLE 2 | 0.940 | 0.960 | 0.980 | 25 | X | 4200 | ○ | X |
| COMPARATIVE EXAMPLE 3 | 1.003 | 0.997 | 0.960 | 2 | ○ | 200 | X | X |
| COMPARATIVE EXAMPLE 4 | 1.001 | 0.990 | 0.980 | 1 | ○ | 500 | X | X |

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

(Examples 1 and 2 and Comparative Examples 1 to 4) A binder, an organic solvent, and a plasticizer were added to powder of barium titanate and wet-mixed. Using the obtained slurry, a ceramic green sheet is formed on a substrate and dried, and then an internal electrode pattern was deposited to form a stack unit. A cover sheet was stacked on the upper and lower sides of a multilayer structure obtained by stacking the stack units, and was thermalluy crimped, and cut into a predetermined chip size. Next, side margin sheets containing barium titanate as a main component ceramic were sequentially attached to the ends of the multilayer structure in the Y-axis direction. The ceramic multilayer structure thus obtained was subjected to binder removal treatment and then fired in a reducing atmosphere. Regarding the Ba/Ti ratio, in the multilayer structure of ceramic green sheets, the sections of 5 μm at the upper and In Example 1, the Ba/Ti ratio in the cover layer was 1.010, the Ba/Ti ratio in the second section was 0.960, and the Ba/Ti ratio in the first section was 0.980. In Example 2, the Ba/Ti ratio in the cover layer was 1.006, the Ba/Ti ratio in the second section was 0.960, and the Ba/Ti ratio in the first section was 0.980. In Comparative Example 1, the Ba/Ti ratio in the cover layer was 0.980, the Ba/Ti ratio in the second section was 0.980, and the Ba/Ti ratio in the first section was 0.980. In Comparative Example 2, the Ba/Ti ratio in the cover layer was 0.940, the Ba/Ti ratio in the second section was 0.960, and the Ba/Ti ratio in the first section was 0.980. In Comparative Example 3, the Ba/Ti ratio in the cover layer was 1.003, the Ba/Ti ratio in the second section was 0.997, and the Ba/Ti ratio in the first section was 0.960. In Comparative Example 4, the Ba/Ti ratio in the cover layer was 1.001, the Ba/Ti ratio in the second section was 0.990, and the Ba/Ti ratio in the first section was 0.980.

(Moisture resistance) Regarding the multilayer ceramic capacitors of Examples 1 and 2 and Comparative Examples 1 to 4, the multilayer ceramic capacitors were polished with a polishing machine so that the cross section was exposed, and the exposed cross section was observed with a SEM (scanning electron microscope) to determine the cover layer. Pore ratio was calculated by (cross-sectional area of pores)/(cross-sectional area of cover layer).

In Example 1, the porosity of the cover layer was 5%. In Example 2, the porosity of the cover layer was 3%. In Comparative Example 1, the porosity of the cover layer was 20%. In Comparative Example 2, the porosity of the cover layer was 25%. In Comparative Example 3, the porosity of the cover layer was 2%. In Comparative Example 4, the porosity of the cover layer was 1%.

Since the moisture resistance decreases as the porosity increases, when the porosity was more than 10%, the moisture resistance was judged to be bad "x". When the porosity was less than 10%, the moisture resistance was judged as "○". For Examples 1 and 2 and Comparative Examples 3 and 4, the moisture resistance was judged to be good "○". Regarding Comparative Examples 1 and 2, the moisture resistance was judged to be poor "x".

(Lifetime) The highly accelerated life was measured for the multilayer ceramic capacitors of Examples 1 and 2 and Comparative Examples 1 to 4. Specifically, the test was performed at 170° C. and 125 V until all 20 samples failed, and the average time of their lifetimes was taken as the lifetime value. In Example 1, the lifetime value was 4500 minutes. In Example 2, the lifetime value was 4900 minutes. In Comparative Example 1, the lifetime value was 4800 minutes. In Comparative Example 2, the lifetime value was 4200 minutes. In Comparative Example 3, the lifetime value was 200 minutes. In Comparative Example 4, the lifetime value was 500 minutes.

When the lifetime value was 3000 minutes or more, the life characteristics were judged to be good "○". When the lifetime value was less than 3000 minutes, the life characteristic was determined to be bad "x". For Examples 1 and 2 and Comparative Examples 1 and 2, the life characteristics were judged to be good "○". For Comparative Examples 3 and 4, the life characteristics were determined to be bad "x".

(Comprehensive judgment) When both the moisture resistance and life characteristics were judged to be good "○", the overall judgment was judged to be good "○". When either one of the moisture resistance and life characteristics was judged to be bad "x", the overall judgment was judged to be bad "x".

In both Examples 1 and 2, the overall judgment was judged to be good "○". This is because the Ba/Ti ratio of the cover layer>badthe first section>the second section provided good denseness in the cover layer and suppressed abnormal grain growth in the first section.

In all of Comparative Examples 1 to 4, the overall judgment was judged as bad "x". It is thought that this was because in Comparative Examples 1 and 2, the Ba/Ti ratio of the cover layer≤the second section≤the first section was such that the Ba/Ti ratio of the cover layer was small, and the densification temperature of the cover layer did not decrease. It is thought that this was because in Comparative Examples 3 and 4, the Ba/Ti ratio of the cover layer>the second section>the first section did not result in a sufficiently small Ba/Ti ratio in the second section, and Ba diffused into the first section and abnormal grain growth occurred.

Although the embodiments of the present invention have been described in detail, it is to be understood that the various change, substitutions, and alterations could be made hereto without departing from the spirit and scope of the invention.

What is claimed is:

1. A multilayer ceramic electronic device comprising:
   a plurality of internal electrode layers that are stacked so as to face each other;
   a plurality of dielectric layers, each of which is provided through each of the plurality of internal electrode layers and has a perovskite structure that includes an A site element and a B site element and is expressed by a general formula of ABO3;
   a pair of cover layers that are respectively provided on an upper end and a lower end in a stacking direction of the plurality of internal electrode layers in a capacity section, and has a main component that is a same as a main component of the plurality of dielectric layers,
   wherein the multilayer electronic device has a substantially rectangular parallelepiped shape,
   wherein each of the plurality of internal electrode layers is alternately extracted to a first end face and a second end face of the rectangular parallelepiped shape opposite to each other,
   wherein the capacity section includes a first set among the plurality of internal electrode layers extracted to the first end face and a second set among the plurality of internal electrode layers extracted to the second end face, the first set and the second set facing each other,
   wherein the capacity section has a first section positioned in a center portion in the stacking direction and a pair of second sections outside of the first section in the stacking direction,
   wherein an A/B ratio of the first section is larger than the A/B ratio of the second section,
   wherein the A/B ratio of the pair of cover layers is larger than the A/B ratio of the first section, and
   wherein the A/B ratio of the first section is 0.98 or less.

2. The multilayer ceramic electronic device as claimed in claim 1, wherein the A/B ratio of the first section is 0.97 or more.

3. The multilayer ceramic electronic device as claimed in claim 1, wherein the A/B ratio of the pair of cover layers is 1.005 or more and 1.010 or less.

4. The multilayer ceramic electronic device as claimed in claim 1, wherein the A/B ratio of the pair of second sections is 0.96 or less.

5. The multilayer ceramic electronic device as claimed in claim 4, wherein the A/B ratio of the pair of second sections is 0.95 or more.

6. The multilayer ceramic electronic device as claimed in claim 1, wherein each thickness of the pair of second sections in a direction in which the plurality of internal electrode layers face each other is 5 μm or less.

7. The multilayer ceramic device as claimed in claim 1, wherein a main component of the plurality of dielectric layers and the pair of cover layers is barium titanate.

8. A manufacturing method of a multilayer ceramic electronic device comprising:
   preparing a plurality of first ceramic green sheets including ceramic having a perovskite structure that includes an A site element and a B site element and is expressed by a general formula of ABO3;
   preparing a plurality of second ceramic green sheets that include the ceramic and have a smaller A/B ratio than the plurality of first ceramic green sheets;
   preparing a pair of third ceramic green sheets that include the ceramic and have a larger A/B ratio than the plurality of first ceramic green sheets;
   forming an internal electrode pattern on each of the plurality of first ceramic green sheets;
   stacking the plurality of first ceramic green sheets on which the internal electrode layer is formed;
   stacking the plurality of second ceramic green sheets on an upper end and a lower end of the plurality of first ceramic green sheets that are stacked;

forming a multilayer structure by respectively stacking the pair of third ceramic green sheets on an upper end and a lower end of the plurality of first ceramic green sheets and the second ceramic green sheets that are stacked; and firing the multilayer structure.

9. The method as claimed in claim 8, further comprising:

forming an internal electrode pattern on each of the second ceramic green sheets.

10. A multilayer ceramic electronic device comprising:

a plurality of internal electrode layers that are stacked so as to face each other;

a plurality of dielectric layers, each of which is provided through each of the plurality of internal electrode layers and has a perovskite structure that includes an A site element and a B site element and is expressed by a general formula of ABO3;

a pair of cover layers that are respectively provided on an upper end and a lower end in a stacking direction of the plurality of internal electrode layers in a capacity section in which the plurality of internal electrode layers face each other, and has a main component that is a same as a main component of the plurality of dielectric layers, wherein the capacity section has a first section positioned in a center portion in the stacking direction and a pair of second sections outside of the first section in the stacking direction, wherein an A/B ratio of the first section is larger than the A/B ratio of the second section, wherein the A/B ratio of the pair of cover layers is larger than the A/B ratio of the first section, and wherein the A/B ratio of the pair of second sections is 0.96 or less.

* * * * *